（12） United States Patent
Livesay et al.

(10) Patent No.: US 6,339,764 B1
(45) Date of Patent: Jan. 15, 2002

(54) PAPERLESS WAREHOUSE MANAGEMENT SYSTEM

(75) Inventors: Mark F. Livesay, Palmyra; David L. Getchell, Lancaster; Chester H. Singer, Lititz, all of PA (US)

(73) Assignee: Woodson Incorporated, Lititz, PA (US)

( * ) Notice: Subject to any disclaimer, the term of this patent is extended or adjusted under 35 U.S.C. 154(b) by 0 days.

(21) Appl. No.: 09/458,812

(22) Filed: Dec. 10, 1999

Related U.S. Application Data
(60) Provisional application No. 60/111,729, filed on Dec. 10, 1998.

(51) Int. Cl.[7] ............................................. G06F 15/24
(52) U.S. Cl. ......................................... 705/28; 705/29
(58) Field of Search ............................ 705/22, 28, 29; 255/385

(56) References Cited

U.S. PATENT DOCUMENTS

| | | | |
|---|---|---|---|
| 2,459,524 A | | 1/1949 | Hanson |
| 4,669,047 A | | 5/1987 | Chucta |
| 4,814,742 A | | 3/1989 | Morita et al. |
| 5,106,259 A | | 4/1992 | Anderson et al. |
| 5,557,528 A | | 9/1996 | Munro et al. |
| 5,671,362 A | * | 9/1997 | Cowe et al. .................. 705/28 |
| 5,712,989 A | * | 1/1998 | Johnson et al. ............. 395/228 |
| 5,933,354 A | * | 8/1999 | Shimada et al. .......... 705/28 X |
| 5,582,497 A | | 12/1999 | Noguchi |
| 6,026,378 A | * | 2/2000 | Onozaki ...................... 705/28 |
| 6,148,291 A | * | 11/2000 | Radican ....................... 705/28 |
| 6,182,053 B1 | * | 1/2001 | Rauber et al. ................ 705/28 |

FOREIGN PATENT DOCUMENTS

EP    639812    *    2/1995

OTHER PUBLICATIONS

Automotive Manufacturing & Production v110n11 pp. 64–68, How ERP systems must meet the challenges of automotive suppliers, Nov. 1998.*
Prepared Foods, v158, p. 122, "Pepperidge Farm's Project Freshness" Nov. 1998.*

* cited by examiner

Primary Examiner—Richard Chilcot
(74) Attorney, Agent, or Firm—James Creighton Wray; Meera P. Narasimhan (57) ABSTRACT

The present invention consists of a Hewlett-Packard Unix-based server, client PCs, client RF (radio-frequency) terminals, and various other peripherals, running warehouse management software developed specifically for high-volume bakeries. Personnel, which include auditors, parkers, checkers, shippers and receivers, are equipped with real-time hand-held RF data terminals. The terminals display information, accept keyed entries, and scan bar codes on production lines, racks, warehouse and truck locations, trucks and products. The system has one server and multiple PC's associated with multiple production lines. The PC's provide information of product made, batch sequences, expected count, current count and batch complete. The auditor supplies racks to the production line and identifies planned racks, marks and places them for movement by the parkers to the shippers. The auditor receives unplanned racks of products, scans the bar code and places the unplanned racks in position for movement to the checkers. The checkers move product from unplanned production racks to shipping racks, scanning the bar codes of the wheeled racks and products and entering amounts as prompted by their terminals, move the completed shipping racks to the truck loading stations, scanning the bar code of the racks and the shipping position. The shippers scan the racks in the shipping position, scan the truck ID and, as prompted by their terminals, roll the racks onto the trucks, position the racks in predetermined positions as prompted, enter the rack position in the truck and scan the rack bar code.

36 Claims, 1 Drawing Sheet

FIG. 1

PAPERLESS WAREHOUSE MANAGEMENT SYSTEM

This application claims the benefit of U.S. Provisional Application No. 60/111,729, filed Dec. 10, 1998.

BACKGROUND OF THE INVENTION

A current need exists for a more reliable and proven paperless warehouse management system. The new system must be capable of providing a logical, orderly and thorough method for receiving and shipping material. It must also be flexible enough to allow for production variances to be reconciled easily and efficiently. A need exists for the minimization of labor and loss of product. The ability to enforce accountability among warehouse personnel also needs to be met.

SUMMARY OF THE INVENTION

The present invention consists of a Hewlett-Packard Unix-based server, client PCs, client RF (radio-frequency) terminals, and various other peripherals, running warehouse management software developed specifically for high-volume bakeries. The software performs several different tasks.

Inventory is received using real-time handheld RF data terminals. Inventory is received as units, trays, and racks. Both planned and unplanned racks are supported. Production orders and shipping orders are received automatically from the host computer, using a network-based file transfer method. The production orders and shipping orders may be modified remotely or locally. The software permits features within a SKU, such as a customized price.

The software also directs checkers (order pickers), using real-time handheld RF data terminals, to move material from production racks to shipping racks, and updates inventory as orders are picked. Identification numbers (a permanent bar-coded label), contents and location of each rack are tracked at all times. Both absolute and approximate storage locations may be used. Parkers are directed using real-time handheld RF data terminals, to move planned and unplanned racks to the shipping areas. Shippers are directed, using real-time handheld RF data terminals, to locate the proper racks for shipment. The software permits the tracking of rack location within a truck.

Additionally, the software generates printed manifests. All shipments are transmitted to the host computer, either immediately when shipped, or as a daily shipment summary. A historical record is kept of all warehouse activity, such as receiving, picking, and other miscellaneous operations, for up to forty (40) days (longer, if more disk space is available). The software maintains up-to-the-moment inventory totals, as well as performing all additional transactions necessary to manage the warehouse. Each transaction is optimized for convenience and speed, minimizing the amount of data entry required.

Personnel, which include auditors, parkers, checkers, shippers and receivers, are equipped with real-time handheld RF data terminals. The terminals display information, accept keyed entries, and scan bar codes on production lines, racks, warehouse and truck locations, trucks and products. The system has one server and multiple PC's associated with multiple production lines. The PC's provide information of product made, batch sequences, expected count, current count and batch complete. The auditor supplies racks to the production line and identifies planned racks (racks full of one SKU for one particular order), marks and places them for movement by the parkers to the shippers. The auditor receives unplanned racks of products, scans the bar code and places the unplanned racks (racks which are not designated for a particular truck) in position for movement to the checkers (order pickers).

The checkers move product from unplanned production racks to shipping racks, scanning the bar codes of the wheeled racks and products and entering amounts as prompted by their terminals, move the completed shipping racks to the truck loading stations, scanning the bar code of the racks and the shipping position. The shippers scan the racks in the shipping position, scan the truck ID and, as prompted by their terminals, roll the racks onto the trucks, position the racks in predetermined positions as prompted, enter the rack position in the truck and scan the rack bar code.

Product received by truck, rather than locally prepared, is received on racks. If a received rack is a planned rack, full of product for one outgoing truck, it is scanned and, as prompted by the receivers's terminal, moved to a truck loading station. The location bar code is scanned and entered on the receiver's terminal.

Unplanned received racks which have products for different shipments are scanned and the product bar codes are scanned as prompted by the terminal. Those products are repositioned on shipping racks whose bar codes are scanned. When the shipping racks are complete, the receivers scan the bar codes and move the shipping racks to the truck loading locations and scan the rack and location codes.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
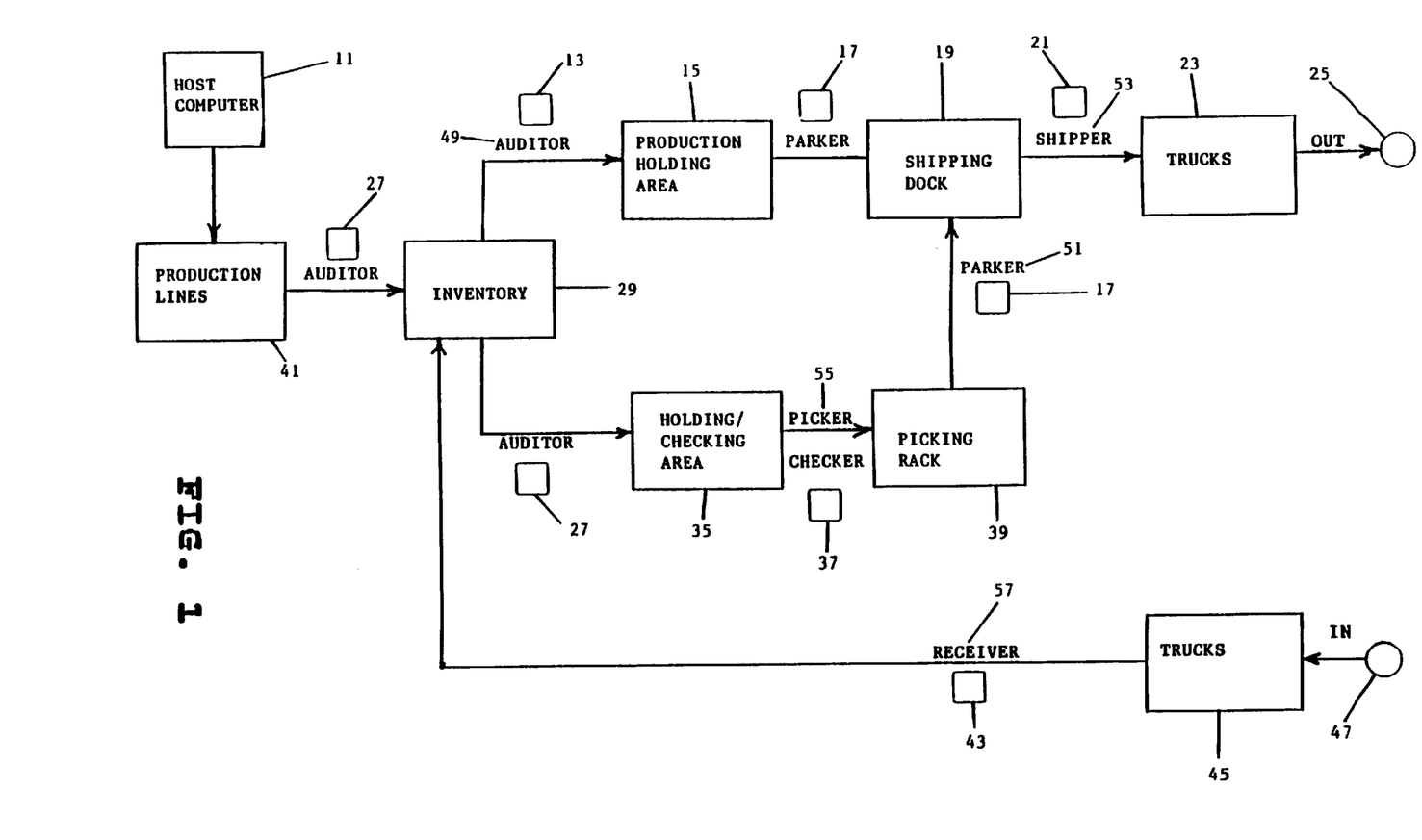
FIG. 1 is a schematic of the paperless warehouse management system.

The following description refers to FIG. 1.

The production schedule indicates the types and estimated amounts of material to be produced for a day. The production schedule is received electronically from the host computer 11, but may also be entered locally. The production schedule consists of production orders. A production order may contain the following information: production date, production line, batch sequence, SKU, feature (such as price) and estimated units.

The system arranges production orders by date, line, and batch sequence into the production schedule. The production schedule may be modified at any time, from either the host computer 11 or local entry. Examples of modifications include: changing the estimated units, removing a batch sequence, inserting a new batch sequence, splitting a batch sequence into two features and moving a batch sequence from one production line to another.

As material is received into inventory by the auditors 49, the following information may be updated per batch sequence: actual units and batch sequence complete.

The production schedules are maintained for up to 40 days. Actual batch counts may be transmitted to the host computer 11 for further archiving.

The system includes screens for viewing and changing the production schedule. It also includes reports for printing the current and historical production schedules.

Actual line counts may be detected automatically at various points in the production line 41, such as the dividers or ovens.

A programmable logic controller (PLC) is included with the system. The PLC is supplied with sensors which may be mounted on the production line 41 to count loaves. The PLC accumulates those counts automatically as the loaves pass the sensors. Six sensors are supplied. Additional sensors may be supported by adding more counting cards to the PLC.

Line changeovers are entered at VT220-compatible terminals located near the sensors. The terminals indicate when batch sequences are complete. The computer then uploads the accumulated count from the PLC, loads the actual count into the database, and resets the PLC's counter in preparation for the next batch.

Six VT220-compatible terminals are supplied, along with twelve line drivers that permit the terminals to be located up to 2000 feet from the computer. The communication wire (containing two twisted pairs) or installation labor is not supplied.

Configuration screens permit multiple counting points per line to be configured.

The VT220 screens are compatible with the RF terminals, so that RF terminals may be used to detect line changeovers, if desired. The VT220 terminals may include the following transactions, selectable at any time: view current status, batch complete and manual batch complete.

The view current status transaction allows the operator to view the status of a production line 41 and count point (such as divider, oven, etc.). It prompts for the production line (which-may be scanned) and the count point (which may be scanned). It then displays the current batch sequence, the expected count (from the production schedule), and the most recent actual count from the PLC (which is automatically updated every 20 seconds).

The batch complete transaction allows the operator to tell the computer that the current production batch sequence is complete. It prompts for the production line 41 (which may be scanned) and the count point (which may be scanned). It then displays the current batch sequence, the expected count (from the production schedule), and the most recent actual count from the PLC (which is automatically updated every 20 seconds). It then prompts the operator for confirmation. The most recent actual count from the PLC is then copied into the database, the current batch sequence is incremented to the next batch, and the PLC's count is reset to zero.

The manual batch complete transaction is similar to the batch complete transaction but prompts the operator for the actual count instead of getting it from the PLC.

Additional transactions permit the following operations: view the previous batch, view the next batch, and set the PLC's count to zero.

The shipping schedule indicates the types and amounts of material to be shipped to the various destinations.

The shipping schedule consists of shipping orders. A shipping order includes the following information: shipment date, shipment ID (depot number), description, shipping sequence (within the shipment date), and individual line items.

Each line item may contain the following information: SKU, feature and ordered quantity.

The system arranges shipping orders by shipping date and shipping sequence into the shipping schedule.

The shipping schedule may be modified at any time, from either the host computer 11 or local entry. Examples of modifications include: creating a new shipping order, changing the shipping sequence of the shipping orders, adding a new SKU to a shipping order, and changing a SKUs ordered quantity.

As material is assigned to shipping orders by the auditors 49, checkers 55, and shippers 53, the following information is updated per shipping order: shipped quantity, rack ID assignments, rack ID complete, and order complete.

The shipping schedules are maintained for up to 40 days. Actual shipped quantities and rack ID assignments may be transmitted to the host computer 11 for further archiving.

The system includes screens for viewing and changing the shipping schedule. Shipping orders may be added, modified, and deleted, and the shipping sequence may be changed. Shipped quantities and rack ID assignments are normally assigned automatically via the RF terminals but may be manually changed using a PC.

A variety of shipping reports are available, including the following: shipping order report, shipment manifest, shipment transaction detail, and current shipping progress.

Auditing is the process of removing material from the production lines 41 and presenting it to the pickers 55 and parkers 51 for assignment to orders.

An auditor 49 keeps the line 41 supplied with empty racks for filling. He takes away full racks and places them in a holding area 35, where the order pickers 55 take them for distribution among the orders.

Each auditor 49 wears an RF terminal 13. The RF terminal 13 may include the following transactions, selectable at any time: create unplanned rack, line changeover, undo planned rack, and undo line changeover.

The create unplanned rack transaction creates an unplanned rack in inventory. It prompts for the production line 41 (which may be scanned). It then displays the current SKU, SKU description, and feature. It then prompts for the rack ID (which is scanned), the number of trays and units on the rack (which defaults to a configurable SKU-dependent value), and the rack storage location (which defaults to a configurable value). The rack is created in inventory, and the production batch sequence's actual units is incremented.

The line changeover transaction tells the computer that the current production batch sequence is complete, and all subsequent material comes from the next batch sequence. It prompts for the production line (which may be scanned). It then displays the current batch's SKU, SKU description, and feature, along with the next batch's SKU, SKU description and feature. It then prompts the operator for confirmation. The current batch's production order is marked as complete, and the next batch's production order is considered the current one.

The undo unplanned rack transaction deletes an unplanned rack from inventory. It prompts for the rack ID (which is scanned). It then displays the rack's SKU, SKU description, feature, and quantity. It then prompts the operator for confirmation. It deletes the rack from inventory, searches for the nearest production batch sequence of that SKU and feature, and decrements the batch's actual units.

The undo line changeover undoes a line changeover. It prompts the operator for the production line (which may be scanned). It then displays the current batch's SKU, SKU description, and feature, along with the previous batch's SKU, SKU description, and feature. It then prompts the operator for confirmation. It resets the current batch sequence to the previous one, and re-opens it.

Additional transactions permit the auditor to perform following operations: query the contents and status of a rack, browse among the production schedule, add and remove product from a rack, and move product from one rack to another.

All auditing transactions are maintained for up to 40 days.

Some orders require sufficient quantities to fill one or more shipping racks with a single SKU and feature. When that happens, it is more efficient to build the rack during the auditing process rather than assembling it later.

The system supports the production of planned racks.

When an order is added to the schedule, the system searches for any SKU and feature whose quantity is large enough to permit planned racks. It then builds a list of the potential planned racks. Each entry in the list may include the following information: shipment date, order ID, SKU, feature, and number of planned racks.

The RF terminal 13 may include the following transactions, selectable at any time: view planned racks, create planned rack and undo planned rack.

The view planned racks transaction displays the potential planned racks available for the SKU and feature currently being produced on a line 41. It prompts for the production line 41 (which can be scanned). It then displays the current SKU, SKU description, and feature. It then displays a list of the orders (in shipping order sequence) which have potential planned racks, and the number of potential planned racks for each order.

The create planned rack transaction creates a planned rack in inventory, and assigns it to an order. A screen similar to "View Planned Racks" appears, but with the ability to choose an order from the list. If the auditor 49 chooses one, he is then prompted for the rack ID (which is scanned), the number of trays and units on the rack (which defaults to a full shipping rack), and the rack storage location (which defaults to a configurable value). The rack is created in inventory, the production batch sequence's actual units is incremented, the rack is assigned to the order, and the number of potential planned racks is decreased.

The undo planned rack transaction undoes a planned rack. It prompts for a rack ID. It then displays the rack's SKU, SKU description, feature, quantity, and assigned order. It then prompts the operator for confirmation. It deletes the rack from inventory, searches for the nearest production batch sequence of that SKU and feature and decrements the batch's actual units, and increments the number of potential planned racks for the order.

Additional transactions permit the auditor 49 to perform following operations: release a planned rack without removing it from inventory, change a planned rack's assignment from one order to another, and convert an unplanned rack to a planned rack.

When a planned rack is created, the auditor 49 attaches a small order identification label to the rack which indicates it's shipping order.

Split planned racks are racks that are assigned to an order upon production, but have two SKUs on them instead of one. It is still more efficient to build split planned racks than to pick a split rack manually.

The system supports the production of split planned racks.

Split planned racks may be created from two SKUs on the same production line 41, or from two independent production lines.

Since some SKUs ship on different types of shipping racks, such as bread vs. cakes, the SKUs "shipping rack type" is checked to determine the potential split planned racks.

When an order is added to the schedule, the system searches for any SKU and feature whose quantity is large enough to permit split planned racks. It then builds a list of the potential split planned racks. Each entry in the list may include the following information: shipment date, order ID, SKU #1, feature #1, SKU #2, and feature #2.

The creation of split planned racks involves two steps: the creation of the rack and the addition of the first SKU, and the completion of the rack and the addition of the second SKU.

Those two steps are usually completed by separate auditors 49. The first auditor 49 puts the first SKU on the rack and stores it in the holding area 15. The second auditor 49 takes it from the holding area 15, adds the second SKU, and returns it to the holding area 15 for shipment.

The RF terminal 13 may include the following transactions, selectable at any time: view split planned racks, begin split planned rack, and finish split planned rack.

The view split planned racks transaction displays the potential planned racks available for the SKU and feature currently being produced on a fine. It prompts for the production line 41 (which may be scanned). It then displays the current SKU, SKU description, and feature. It then displays a list of the orders (in shipping order sequence) that have potential planned racks, including both the racks that have been begun and those which have not.

The begin split planned rack transaction creates a split planned rack in inventory, and assigns it to an order. A screen similar to "View Split Planned Racks" appears, but with the ability to choose an order from the list. If the auditor chooses one, he is then prompted for the rack ID (which is scanned), the number of trays and units on the rack (which defaults to a full shipping rack), and the rack storage location (which defaults to a configurable value). The rack is created in inventory, the production batch sequence's actual units is incremented, the rack is assigned to the order, and the number of potential split planned rack is updated.

The finish split planned rack transaction completes a split planned rack in inventory. It prompts for the production line (which may be scanned). It then displays the current SKU, SKU description, and feature. It then displays a list of the partially-completed split racks which require this SKU. The auditor 49 chooses one, and then confirms it by scanning the rack ID. He is then prompted for the number of trays and units on the rack (which defaults to one-half of a shipping rack), and the rack storage location (which defaults to a configurable value). The split rack is added to the inventory, the production batch sequence's actual units is incremented, and the split planned rack is marked as complete.

Additional transactions permit the auditor 49 to perform the following operations: undo the creation or completion of a split planned rack, release a split planned rack without removing it from inventory, and create a split planned rack from unplanned material.

When a split planned rack is created, the auditor 49 attaches a small order identification label to the rack which indicates its shipping order.

Checking is the process of taking material from the production holding area 35 and distributing it among the orders. A checker 55 takes an unplanned production rack from the production area 35 and takes it to a picking rack 39 assigned to the first shipping order. The checker 37 moves the amount of material required by the order from the production rack to the picking rack 39. He then takes the production rack to a picking rack assigned to the next shipping order and repeats the process.

When the production rack is empty, he takes another and continues the process.

Each checker 55 wears an RF terminal 37. The RF terminal 37 may include the following transactions, selectable at any time: choose production line and checking zone, check next item, look ahead, look back, undo last check, and shipping rack complete.

The choose production line and checking zone transaction lets the checker 55 tell the computer 11 which production line 41 and checking zone the checker is working on. Since a checker 55 generally works one production line 41 at a time, entering the production line once speeds the entry of the remaining transactions. The checking zone refers to a group of orders. Some orders may be checked in a different location than others. That permits multiple checkers to be checking the same SKU on the same production line simultaneously, while checking separate groups of orders so that they do not interfere with each other.

The check next item transaction is the basic transaction for checking orders. The system searches for the first order in the shipping schedule which requires the first SKU that has been produced on that production line 41. If no order is found, it repeats the process for the next SKU which was produced on the line. When it finds the first SKU and order combination, it displays the SKU, SKU description, feature, order ID, and the number of trays and units required by the order. It then prompts for the rack ID of the production rack (which is scanned) and the rack ID of the shipping rack (which is scanned). If the shipping rack is not already assigned to the order, the checker is notified and told to attach a small order identification label to the shipping rack. It then prompts for the number of trays and units actually moved (the default is the required value). The system then moves the inventory from the production rack to the shipping rack, decrementing the production inventory and crediting the order.

The look ahead transaction previews the next five "Check Next Item" prompts which will appear on the checker's RF terminal for that production line 41 and checking zone.

The look back transaction recalls the previous five "Check Next Item" prompts that were entered on the checker's RF terminal 37, for that production line 41 and checking zone.

The undo last check transaction undoes the previously-entered "Check Next Item" transaction. The inventory is moved back onto the production rack, and the order is debited. The user is shown the transaction, and prompted for confirmation.

The shipping rack complete indicates to the parkers 51 that a shipping rack is complete and ready to be moved to the shipping dock. It prompts for the rack ID (which is scanned). It then prompts for confirmation. It then marks the shipping rack as complete, which causes it to appear on the parker's 51 list of outstanding work.

Additional transactions may permit the checker 37 to perform the following operations: query the contents and status of a rack, browse among the production schedule, manually add and remove product from a picking rack, move product from one picking rack to another, assign a picking rack to an order without placing any material on it, remove the "Complete" status from a picking rack, and display a list of the available unplanned racks (and their rack IDs) for the SKU.

All checking transactions are maintained for up to 40 days.

During the "check next item", the computer displays the quantity of trays and units to check, and prompts for the quantity of trays and units actually moved. The computer suggests the proper values.

If the checker 55 changes the value to something larger, there may be several reasons for that: it was deliberate or it was a mistake.

In that instance, the computer 11 tells the checker 55 that he checked too much, and displays the following selections: continue anyway, and undo and return.

The continue anyway transaction means that the larger amount was deliberate, and that the transaction should be processed as entered.

The undo and return transaction means that the larger amount was a mistake, the transaction should be undone, and the screen returned to the checking transaction prompt.

During the "check next item" transaction, the computer 11 displays the quantity of trays and units to check, and prompts for the quantity of trays and units actually moved. The computer suggests the proper values.

If the checker 55 changes the value to something smaller, there may be several reasons for that: it was deliberate, it was a mistake, there wasn't enough material on the production rack and checking will continue with another production rack, there wasn't enough room on the shipping rack and checking will continue with another shipping rack, and the SKU will be produced again later but there's none available now.

In that instance, the computer tells the checker 55 that he didn't check enough, and displays the following selections: continue anyway, complete later, and undo and return.

The continue anyway transaction means that the smaller amount was deliberate, and that the transaction should be processed as entered.

The complete later transaction means that the smaller amount was deliberate, but that the order should remain open for completion at a later time.

The undo and return transaction means that the smaller amount was a mistake, the transaction should be undone, and the screen returned to the checking transaction prompt.

Parking is the process of taking racks from the production holding area 15 or the picking rack 39 and moving them to the shipping dock 39.

A parker 17 takes completed checked racks from the picking rack 39 to the shipping dock 19. The parker 17 also takes completed planned and split planned racks from the production area 15 to the shipping dock 19.

Each parker 51 gears an Rf terminal 17. The RF terminal 17 may include the following transactions, selectable at any time: choose parking zone, view zone workload, view total workload, and move rack.

The choose parking zone transaction lets the parker 51 tell the computer which parking zone the parker is working on. Multiple parking zones may be defined, and may include the production area (for planned racks), as well as the various areas used for checking. Since a parker generally works one area at a time, entering the parking zone once speeds the entry of the remaining transactions. That permits multiple parkers 51 to work simultaneously without interfering with each other.

The view zone workload transaction displays a summary of the outstanding work for the current parking zone. It displays a list of each shipping order (in shipping sequence) that has completed racks (either planned or checked) currently stored in the parking zone, along with the number of completed racks per order.

The view total workload transaction displays a summary of the outstanding work for all parking zones. It displays a list of each parking zone, along with the total number of completed racks currently stored in the parking zone.

The move rack transaction is the basic transaction for parking completed racks. It prompts for the rack ID of a completed rack (which is scanned), and verifies that the rack is complete and assigned to an order. It then displays the assigned order ID and the assigned shipping dock. When the rack has been moved to the shipping dock 19, it prompts for the shipping dock location. The system then moves the rack from the original location to the shipping dock 19.

Additional transactions may permit the parker 51 to perform the following operations: query the contents and status of a rack, move a rack from a shipping dock back to a checking or production location, and undo the last parking transaction.

All parking transactions are maintained for up to 40 days.

Shipping is the process of taking racks from the shipping dock 19 and placing them onto the trucks 23 for shipment.

A shipper 53 takes completed checked racks from the shipping dock 19 to a truck 23. He loads the racks onto the truck 23, and enters the truck ID and rack location within the truck.

Once an order is complete, both paper and electronic manifests may be generated.

The electronic manifest may be generated either immediately when an order is shipped, or may be held for a daily batch upload.

Each shipper 53 wears an RF terminal 21. The RF terminal 21 may include the following transactions, selectable at any time: choose order, view dock summary, view dock detail, ship rack, order complete, and truck complete.

The choose order transaction lets the shipper 53 tell the computer 11 which order the shipper is working on. Since a shipper 53 generally works one order at a time, entering the order once speeds the entry of the remaining transactions. A list is displayed of the outstanding orders, sorted by shipping sequence. The shipper chooses one. Multiple shippers 53 may work on the same order simultaneously.

The view dock summary transaction displays a summary of the outstanding work for the current order. It displays the total number of completed racks assigned to the order which have not yet been loaded onto a truck.

The view dock detail transaction displays a detailed list of the completed racks assigned to the order that have not yet been loaded onto a truck. It includes each rack's ID and location.

The ship rack transaction is the basic transaction for shipping completed racks. It prompts for the rack ID of a completed rack (which is scanned), and verifies that the rack is complete and assigned to the currently-selected order. When the rack has been moved into the truck, it prompts for the truck ID and the location within the truck. The system then moves the rack from the location to the truck.

The order complete transaction signifies that all racks for an order are loaded onto trucks, and that they may not be recalled. The order is considered shipped, and a manifest is automatically printed.

The truck complete transaction signifies that all racks for a truck have been loaded. That transaction must be performed before the order complete transaction.

Additional transactions may permit the shipper 53 to perform the following operations: query the contents and status of a rack, move a rack from a truck to a shipping dock, move a rack from a shipping dock back to a checking or production location, and undo the last shipping transaction (order complete transactions may not be undone).

All shipping transactions are maintained for up to 40 days.

The following shipping documents may be created: truck detail, order summary, and order detail.

The truck detail transaction contains a detailed list of the racks on a truck, including each rack's rack ID, assigned order, location in the truck, and optional inventory detail.

The order summary transaction is a summary quantity of each SKU and feature shipped with the order.

The order detail is a detailed list of each rack of an order, including, each rack's rack ID, truck ID, location in the truck, and optional inventory detail.

Some material is received from other plants, and immediately cross-docked for shipment.

That material must be received into inventory, tracked, and shipped just like any internally-produced material. It must appear on the manifest, and must be transmitted to the host computer 11 as a shipment.

A receiver 57 takes racks from incoming trucks 45 and attaches permanent barcode stickers to them if they don't already have them. He then identifies each rack's order, and receives the material into inventory 29.

Each rack is received into inventory 29 as a completed rack which is assigned to an order. From this point on, the parking and shipping process may proceed as normal.

Each receiver 57 wears an RF terminal 43. The RF terminal 43 may include the following transactions, selectable at any time: set receiving location, receive rack, and look back.

The set receiving location transaction prompts for the location of the receiving dock. That needs to be done only once, when receiving begins. It determines the location of any racks which are received using this function.

The receive rack transaction is the basic transaction for receiving completed racks. It identifies a rack, its order, and its contents to the computer. It prompts for a rack ID (which is scanned) and an order ID (which must be in the days shipping schedule). It then prompts for a UPC code or SKU (and a feature, if desired), and tray and unit quantities. If the rack is not in inventory, it is automatically created, assigned to the order, and the first SKU is created in inventory. It then prompts for a second UPC code or SKU. The process may continue without interruption until a blank UPC code is entered.

The look back transaction displays the previous five SKUs received, along with the rack IDs and orders.

Additional transactions may permit the receiver to perform following operations: query the contents and status of a rack, move a rack from the receiving dock to another location, view the detailed contents of a rack, one SKU at a time, and undo the last receiving transaction.

All receiving transactions are maintained for up to 40 days.

If the software is installed at multiple locations, future extensions may permit the ability to transmit expected receipts from one location to another, eliminating the need to enter SKUs and quantities.

Some material may not be assigned to an order when it's received. In this case, it may be received into inventory 29 in a way similar to produced material, and then checked in the normal manner.

To accomplish this, the RF terminal 43 may include the following transactions, selectable at any time: receive unplanned rack, and check unplanned rack.

The receive unplanned rack transaction is the basic transaction for receiving racks that are not assigned to an order. It works in the same way as "receive rack", but does not prompt for an order. When it is finished, the rack is in inventory, but available for checking.

The check unplanned rack transaction provides an efficient method for checking a received rack that has multiple types of material on it. It prompts the rack ID (which is scanned). It then searches through each order, beginning with the first, looking for any material on the rack which may be sent to the order. If it finds any, it continues in the same manner as the "check next item" transaction. That transaction is repeated until the rack is empty.

Bakeries typically produce too much or too little of a product.

If too little of a product is produced, it is sometimes desirable to deduct smaller amounts from each order, instead of deducting all of it from the last one.

Likewise, if too much of a product is produced, it is sometimes to distribute the excess among all the orders.

Shortfalls or excesses are not distributed equally among orders. An allocation table specifies the percentage of each shortfall or excess that is applied to each order.

The determination of those percentages is performed automatically, using the allocation table.

The default allocation table is a list of orders, with a percentage applied to each order. Those percentages add up to 100%. An example is given below:

| Order | | Percentage |
|---|---|---|
| 2260 | Sylmar | 24% |
| 2500 | Montclair | 28% |
| 2900 | Mexico City | 19% |
| 2950 | Acapulco | 29% |

Additional allocation tables may be specified for any specific SKU, or SKU and feature.

The system compares the daily production schedule to the shipping schedule to determine shortfalls or excesses.

The details of the triggering, timing, and personnel allocation involved in allocation are not known at this time. However, a cost allowance has been built into the proposal to cover the design and implementation of allocation.

The system architecture is a mixture of host-based and client-server computing. At the center is a Hewlett-Packard Unix server. Client PCs are connected to the server via an Ethernet network, and operate as remote clients. The RF terminals are also connected to the server via the Ethernet-based base radios, but operate as local clients. If a PC doesn't have access to the graphical programs, the system supports Telnet-based VT220 access to the application.

Because the RF application is written as a generic VT220 terminal application, most RF equipment vendors supply compatible RF terminals and base radios. Symbol and Norand equipment have been quoted separately.

The system may include the following hardware and purchased software:

Server Hardware:
1 Hewlett-Packard model D250 PA-RISC server
128 NIB ECC memory
Dual 2.0 GB fast-wide SCSI-2 hard disks (mirrored)
CD-ROM drive
2.0 GB 4 mm tape backup unit
10baseT Ethernet connection
Console terminal
Uninterruptible power supply
Remote-access telephone, modem
24×7 on-site support with 4-hour response time (1 year)
Server software:
2-user HP-UX operating system license (RF terminals use a license, remote PCs do not)
MirrorDisk-UX disk mirroring software
24×7 telephone support with 4-hour response time (1 year)
Progress Software Corporation DBMS/4GL software:
40-user Workgroup Database Server license for HP-UX
1-user 4GL Development license for HP-UX
10-user Network Client license for Windows 95 or Windows NT
Telephone support (1 year)
Client PCs:
3 Client PCs, each containing (minimum): 133 MHZ Pentium, 32 MB memory, 1.0 GB disk drive, 17" monitor, Ethernet connection, keyboard, and mouse
Other inventory system peripherals:
2 Hewlett-Packard LaserJet 5 printers
20 4 mm tapes for backup The two disk drives mirror each other. If one fails, the other automatically takes over.

A dedicated telephone line available to the computer is required. This line will be used to perform remote diagnostics and provide software support. That telephone line must be (or simulate) a direct dial-in line.

The Symbol hardware assumes that 28 RF terminals are purchased, and 5 base radios are required.

Symbol Spread Spectrum System:
1 Network control Unit, 48-terminal support
1 TCP/IP Ethernet Terminal Emulation Software for NCU
Transceiver Interface:
5 4-Port RF LAN Interface
5 Transceiver Ethernet Adapters
5 Spectrum One Transceivers
5 Antenna Kits
5 Dummy Load Antennas
Terminals And Accessories:
28 WS 1000 Wearable Terminal System with 8-line display and trigger scanner
28 VT220 emulation software
7 4-slot universal chargers
1 4-slot cradle for downloading
5 spare ring mounts
56 Lithium battery packs
Miscellaneous:
Site survey
System engineering support The Norand hardware assumes that 28 RF terminals are purchased, and 5 base radios are required.

Norand Spread Spectrum System:
Norand 6950 Linux gateway server with VT220 emulation
Transceiver Interface:
5 model 6710 Access Point
5 OWL PCMCIA Radio Card 5 Antenna Kits Terminals And Accessories:

28 RTI 750 handheld RF data terminal with built-in scanner

28 VT220 emulation software 28 chargers

56 NiMH battery packs 28 pistol grips 28 carrying cases 1 cloning cable

Miscellaneous:

NetManage TCP/IP protocol stack, HP OpenView for Windows, <100 nodes

Site survey

System engineering support

No allowance has been included for network wiring or for network hardware such as hubs or repeaters, for the following reasons. It is not yet known whether the PCs and printers may use the existing network infrastructure or not. No RF site survey has been performed, so the amount of wire required by the base radios is not known. The location of the server is not known.

Both the Norand and Symbol equipment require a Thin-Net (10base2) wiring system. The PCs and printers may use either 10base2 or 10baseT.

Once the wiring and networking requirements are known, a quote on the necessary wire and network hardware may be made. Alternatively, the wire and network hardware may be purchased through any third party.

The automated production count option includes the following hardware and purchased software:

Server hardware:

64-port serial interface card 16-port RS232 DB25 port module

Server software:

Upgrade HP-UX license from 32 users to 64 users

ANSI C compiler

Progress Software Corporation DBMS/4GL software:

Upgrade Workgroup Database Server license from 40 users to 48 users

Other inventory system peripherals:

12 serial line drivers (Black Box model SHM-B)

1 8-card -serial line driver rack

6 VT220-compatible terminals

PLC and peripherals:

1 Allen-Bradley SLC503 processor with rack and power supply

Enclosure for above 3 dual-port high-speed counting cards

KE computer interface card

Engineering, programming, and shop assembly

The appearance of the screens is consistent throughout the application. Data entry and display use the Microsoft Windows 95 (or Windows NT Client) graphical user interface on PCs, and is consistent with commonly-used Windows operational standards. Prompt lines and error messages always appear in the same places and manner on the screen.

All application software is menu-driven. No knowledge of Unix command level operation is necessary.

Consistent use of function keys and defaults keep operator keystrokes to a minimum.

Security is enforced by password control while logging into the system.

The user table specifies the users who may access the system. That table includes each user's name, password, and user type.

The user type table specifies the different kinds of users, such as "picker", "manager", "administrator", or "clerk". Each individual function or program may be turned "on" or "off" per user type.

Passwords are encrypted within the database. Even if the encrypted passwords are discovered and displayed, they are of no value.

A variety of reports are included with the system. All reports may be directed to either the user's screen or a printer. Reports may be scheduled to run automatically at specified times and days of the week.

The exact types and contents of the reports are not known at this time. From past experience, the reports will fall into the following categories: current inventory reports, historical movement reports, production order reports, shipping order reports, and administrative reports.

A TCP/IP-based Ethernet network is included with the system. This link may connect the computer to a host computer (supplied by Owner). TCP/IP and NFS networking software is included with the system. The system may perform the following operations via the network: receive production orders, shipping orders, SKU definitions, and other owner-specified information from the host computer; transmit actual production counts, actual shipments, inventory balances, and other owner-specified information to the host computer; and allow remote users on additional customer-supplied PCs to log into the system (both GUI and VT220-style interfaces are included).

The file format for sending and receiving data will be agreed upon during the design phase of the project.

If the network fails, data may be received and transmitted using 3.5" floppy disks.

Additionally, a token-ring network card is included with the system.

To transmit a file to the system, the host system uses FTP or NFS to copy a file to a directory. The system periodically scans this directory for incoming files, sorts them by date or name, and then processes them. After they are processed, the system automatically deletes them.

To receive a file from the system, the host system uses FTP or NFS to copy all files from a directory. The system places all outbound files in this directory, naming them numerically, from 0000000.out through 99999999.out (numbers may be skipped). If the host computer doesn't delete them explicitly, the system deletes them automatically after a predetermined amount of time.

Utilities are included for performing the following functions: starting up and shutting down the database, backing up the database to tape, restoring the database from tape, scheduling daily database backups to occur at a specified time (the system supports on-line backups of the database, permitting full 24-hour operation of the application), accessing the database performance/resource monitor, and monitoring the system's overall performance.

Those utilities are menu-driven, requiring no knowledge of the operating system.

Remaining system administration tasks are performed directly through the computer's operating system using the menu-based programs supplied by Hewlett-Packard.

A file of key indicators is maintained by the system. The contents of that file are not known, and must be engineered. That provides a mechanism for quickly obtaining summary information without having to calculate it every time it is rewired. Key indicators are maintained historically.

Because the system keeps an exact record of the units that are assigned to each order, exact lot tracking may be maintained.

By default, th e system defines a lot to be a SKU, and production day. If desired, lot traceability may be extended to include feature and/or batch sequence within the production day. Alternatively, the auditing screens may prompt for a lot number when creating inventory.

The production day of received material may not be known. The receiving screens may prompt for a production day or lot number, if desired.

Setup and installation of the server and client PCs will be completed by the inventor. Installation of the base radios, and all power and communication wiring, will be completed by the owner. The inventor will work with the owner to verify the proper operation of the wiring.

Prior to the inventor's arrival on the site, the following site conditions must be met. Electrical power must be available to all locations where inventor-supplied equipment will be located. All construction must be complete at all locations where inventor-supplied equipment will be located. The RF base radios must be installed (to be supplied by the inventor), and power and data cabling complete. All network cables must be installed (certain cables are to be supplied by the present inventor).

Upon arrival on the site, the inventor will perform the following tasks. Unpack the server, set it up, and verify it's operation. Unpack the PCs and printers, set them up, and verify their operation. Assist in verifying the proper operation of the base radios and network. Assist in verifying the proper operation of the connection to the host computer.

While the invention has been described with reference to specific embodiments, modifications and variations of the invention may be constructed without departing from the scope of the invention, which is defined in the following claims.

We claim:

1. An apparatus for managing a warehouse, comprising:
    a host computer server;
    at least one personal computer connected to the host computer server for receiving a production schedule from the host computer server and modifying the production schedule remotely;
    at least one radio-frequency (RF) terminal connected to the host computer server for receiving a production schedule from the host computer server and modifying the production schedule remotely;
    at least one production line that receives the production schedule from the host computer and for producing product in response to the production schedule;
    an inventory area for receiving product from the at least one production line;
    a holding area for receiving product from the inventory area and arranging product into orders set by the production schedule; and
    a shipping area for receiving product from the holding area and for preparing the product for shipment.

2. The apparatus of claim 1, wherein the at least one personal computer is connected to the host computer server via an Ethernet network.

3. The apparatus of claim 1, wherein the at least one RF terminal is connected to the host computer server via an Ethernet-based base radio.

4. The apparatus of claim 1, wherein at least one of the at least one RF terminals is located proximal the production line for modifying the production schedule in to response the produced product.

5. The apparatus of claim 1, wherein at least one of the at least one RF terminals is located proximal the inventory area for modifying the production schedule in response to the product received by the inventory area.

6. The apparatus of claim 1, wherein at least one of the at least one RF terminals is located proximal the holding area for modifying the production schedule in response to the product received by the holding area.

7. The apparatus of claim 1, wherein at least one of the at least one RF terminals is located proximal the shipping area for modifying the production schedule in response to the product received by the shipping area.

8. The apparatus of claim 1, wherein the holding area further comprises a first production holding area for receiving planned product from the inventory area and a second production holding area for receiving unplanned product from the inventory area.

9. The apparatus of claim 8, further comprising a picking rack for receiving unplanned product from the second production holding area.

10. The apparatus of claim 8, wherein at least one of the at least one RF terminals is located proximal the first production holding area for modifying the production schedule in response to the product received by the first production holding area.

11. The apparatus of claim 1, wherein at least one of the at least one RF terminals is located proximal the second production holding area for modifying the production schedule in response to the product received by the second production holding area.

12. The apparatus of claim 9, wherein at least one of the at least one RF terminals is located proximal the picking rack for modifying the production schedule in response to the product received by the picking rack.

13. The apparatus of claim 1, further comprising at least one sensor mounted on the at least one production line for counting product produced by the at least one production line.

14. The apparatus of claim 13, wherein the at least one personal computer is located proximal the at least one sensor for modifying the production schedule in response to the production count made by the sensor.

15. The apparatus of claim 1, further comprising a receiving area for receiving product that is produced external to the at least one production line and for sending received product to the inventory area.

16. The apparatus of claim 15, wherein at least one of the at least one RF terminals is located proximal the receiving area for modifying the production schedule in response to the product received by the receiving area.

17. The apparatus of claim 1, further comprising a scanner on the at least one RF terminal for scanning bar codes on the product for modifying the production schedule.

18. A warehouse management system, comprising:
    providing a production schedule from a host computer server to at least one production line;
    receiving the production schedule from the host computer server with at least one personal computer connected to the host computer server;
    receiving the production schedule from the host computer server with at least one radio frequency (RF) terminal connected to the host computer server;
    producing product with the at least one production line in response to the received production schedule;
    moving the product from the at least one production line to an inventory area;

marking the product as either planned product or unplanned product;

moving the planned product from the inventory area to a first production holding area;

moving the planned product from the first production holding area to a shipping area;

moving the unplanned product from the inventory area to a second production holding area;

moving the unplanned product from the second production holding area to a picking rack;

moving the unplanned product from the picking rack to the shipping area; and preparing the planned and the unplanned product in the shipping area for shipment.

19. The system of claim 18, wherein the moving the product from the at least one production line to an inventory area and marking the product further comprises providing a first auditor for moving and marking the product.

20. The system of claim 18, wherein the moving the planned product from the inventory area to a first production holding area further comprises providing a second auditor for moving the product.

21. The system of claim 18, wherein the moving the unplanned product from the inventory area to a second production holding area further comprises providing a third auditor for moving the product.

22. The system of claim 18, wherein the moving the planned product from the first production holding area to a shipping area further comprises providing a first parker for moving the planned product.

23. The system of claim 18, wherein the moving the planned product from the second holding area to a picking rack further comprises providing a checker for moving the unplanned product.

24. The system of claim 18, wherein the moving the unplanned product from the picking rack to the shipping area further comprises providing a second parker for moving the unplanned product.

25. The system of claim 18, wherein the preparing the planned and the unplanned product in the shipping area for shipment further comprises providing a shipper for preparing the planned and the unplanned product.

26. The system of claim 18, further comprising receiving the product from a source other than the at least one production line in a receiving area, and moving the product from the receiving area to the inventory area.

27. The system of claim 26, wherein the receiving the product and moving the product further comprises a receiver for receiving the product and moving the product.

28. The system of claim 18, further comprising:

mounting at least one sensor on the at least one production line;

counting the produced product with the sensor;

providing the at least one personal computer proximal the at least one sensor;

transmitting the count from the sensor to the at least one personal computer;

transmitting the count from the at least one personal computer to the host computer server; and modifying the production schedule in response to the count received by the host computer server.

29. The system of claim 19, further comprising providing the first auditor with an RF terminal for scanning the product and modifying the production schedule.

30. The system of claim 20, further comprising providing the second auditor with an RF terminal for scanning the product and modifying the production schedule.

31. The system of claim 21, further comprising providing the third auditor with an RF terminal for scanning the product and modifying the production schedule.

32. The system of claim 22, further comprising providing the first parker with an RF terminal for scanning the product and modifying the production schedule.

33. The system of claim 23, further comprising providing the checker with an RF terminal for scanning the product and modifying the production schedule.

34. The system of claim 24, further comprising providing the second parker with an RF terminal for scanning the product and modifying the production schedule.

35. The system of claim 25, further comprising providing the shipper with an RF terminal for scanning the product and modifying the production schedule.

36. The system of claim 27, further comprising providing the receiver with an RF terminal for scanning the product and modifying the production schedule.

* * * * *